(12) United States Patent
Kang et al.

(10) Patent No.: US 8,306,410 B2
(45) Date of Patent: Nov. 6, 2012

(54) PHOTOGRAPHIC DEVICE HAVING OPTICAL IMAGE STABILIZATION MODULE AND OPTICAL IMAGE STABILIZATION PHOTOGRAPHIC DEVICE HAVING PERIPHERAL DRIVER CHIP

(75) Inventors: Yu-Kai Kang, Hsinchu (TW); Yu-Ming Cheng, Hsinchu (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 13/109,610

(22) Filed: May 17, 2011

(65) Prior Publication Data

US 2012/0063756 A1  Mar. 15, 2012

(30) Foreign Application Priority Data

Sep. 15, 2010  (TW) ............................... 99131321 A
Mar. 4, 2011   (TW) ............................... 00107454 A (51) Int. Cl.
*G03B 17/00* (2006.01)

(52) U.S. Cl. ..................................... 396/55; 348/208.11

(58) Field of Classification Search .............. 396/52–55; 348/208.99, 208.4, 208.11; 359/557
See application file for complete search history.

(56) References Cited

U.S. PATENT DOCUMENTS

| | | | |
|---|---|---|---|
| 7,003,691 B2* | 2/2006 | Safford et al. ................. | 714/11 |
| 7,496,289 B2* | 2/2009 | Yamazaki ....................... | 396/55 |
| 7,804,645 B2* | 9/2010 | Morita et al. .................. | 359/554 |
| 2002/0097993 A1* | 7/2002 | Imada ............................. | 396/55 |
| 2008/0012946 A1* | 1/2008 | Lee et al. .................... | 348/208.4 |
| 2009/0127694 A1 | 5/2009 | Noro et al. | |
| 2010/0158493 A1* | 6/2010 | Miyasako ....................... | 396/55 |
| 2011/0157380 A1* | 6/2011 | Yamazaki ................. | 348/208.4 |

FOREIGN PATENT DOCUMENTS

| | | |
|---|---|---|
| TW | 200916940 | 4/2009 |
| TW | 200941663 | 10/2009 |

* cited by examiner

*Primary Examiner* — Christopher Mahoney
(74) *Attorney, Agent, or Firm* — Morris Manning & Martin LLP; Tim Tingkang Xia, Esq.

(57) ABSTRACT

A photographic device having an optical image stabilization (OIS) module includes a compensation unit, a first position sensor, a second position sensor, a first vibration detection unit, a second vibration detection unit, a first actuator, a second actuator and a central processing unit (CPU). The CPU includes an anti-shake processing unit. The anti-shake processing unit processes vibration signals output by the first vibration detection unit and the second vibration detection unit and position signals output by the first position sensor and the second position sensor, and drives the first actuator and the second actuator to adjust positions of the compensation unit in the first direction and in the second direction and further compensate the shake of the photographic device having the OIS module in the first direction and in the second direction.

15 Claims, 6 Drawing Sheets

PHOTOGRAPHIC DEVICE HAVING OPTICAL IMAGE STABILIZATION MODULE AND OPTICAL IMAGE STABILIZATION PHOTOGRAPHIC DEVICE HAVING PERIPHERAL DRIVER CHIP

CROSS-REFERENCE TO RELATED APPLICATIONS

This non-provisional application claims priority under 35 U.S.C. §119(a) on Patent Application No. 099131321 filed in Taiwan, R.O.C. on Sep. 15, 2010 and Patent Application No. 100107454 filed in Taiwan, R.O.C. on Mar. 4, 2011, the entire contents of which are hereby incorporated by reference.

BACKGROUND OF THE INVENTION

1. Field of Invention

The present invention relates to a photographic device having an optical image stabilization (OIS) module and an OIS photographic device having a peripheral driver chip, and in particularly to a photographic device having the OIS module which integrates a circuit for image stabilization into a central processing unit (CPU) and an OIS photographic device having a peripheral driver chip which integrates a circuit for driving an OIS mechanism unit into the peripheral driver chip.

2. Related Art

The digital image stabilization method and the optical image stabilization (OIS) method are the main image stabilization methods of a photographic device. In the digital image stabilization method, the photographic device makes an image recorded by an image sensor transmitted to a processing module, obtains the shifting parts by comparing the consecutive images and then corrects the shifting parts. The photographic device has two kinds of OIS methods, wherein one kind of OIS method is the lens anti-shake method and another kind of OIS method is the photosensitive element anti-shake method. In the lens anti-shake method, a compensation lens for image stabilization is installed in the camera, and the photographic device adjusts the position or the angle of the compensation lens according to the vibration detected by the sensor to output a clear image. In the photosensitive element anti-shake method, the photographic device adjusts the position or the angle of the photosensitive element according to the vibration detected by the sensor to output a clear image.

ROC Publication No. 200916940 has disclosed a stabilization controlling circuit, wherein the stabilization controlling circuit controls an optical part-driving element for moving an optical part provided in a camera device, based on an output signal of a vibration detecting element provided in the camera device, wherein the stabilization controlling circuit includes an analog-digital converting circuit converting an analog signal outputted from a position-detecting element for detecting position of the optical part to a digital signal, and a servo circuit generating a compensating signal for compensating the position of the optical part based on the output signal of the analog-digital converting circuit and outputting it to the optical part-driving element, the servo circuit being configured to including a digital filter circuit and a register, the digital filter circuit performing a filter processing based on filter coefficients stored in the register. Therefore, the stabilization controlling circuit is provided to be capable of calculating movement amount of camera device without using CPU, so as to reduce consumption power as well as to suppress influence of shaking of hand to obtain high quality of video signal.

Furthermore, it can be found from the related techniques and researches, such as ROC Patent Publication No. 200941663 and US Patent Publication No. 2009127694, that to meet the market demands for light, thin, short and small cameras, the OIS circuit is developed in the trend of reducing the volume of the control circuit. However, as the volume of the OIS circuit is reduced, the OIS circuit and the CPU needs a further processing step to communicate with each other due to the cross-platform operation, which further causes the problem of increased cost.

SUMMARY OF THE INVENTION

Accordingly, the present invention provides a photographic device having an optical image stabilization (OIS) module and an OIS photographic device having a peripheral driver chip, on one hand, the present invention reduces the space needed by the OIS circuit to meet the market demands, on the other hand, the present invention solves the problem of increased cost existing in the prior art caused by the fact that the OIS circuit and central processing unit (CPU) needs a further processing step to communicate with each other due to the cross-platform operation.

According to a photographic device having an OIS module disclosed in an embodiment of the present invention, the photographic device having the OIS module comprises a first vibration detection unit, a second vibration detection unit, a first filter, a second filter, a compensation unit, a first position sensor, a second position sensor, a first actuator, a second actuator, and a CPU. The CPU comprises a first servo driver circuit, a second servo driver circuit, a register unit (or referred to as a register), a pulse-width modulation (PWM) unit (or referred to as a pulse-width modulator), and an anti-shake processing unit. The first servo driver circuit comprises a first amplifier unit and a first driving unit, and the second servo driver circuit comprises a second amplifier unit and a second driving unit. After detecting the vibration of the photographic device having the OIS module in first direction due to the shake, the first vibration detection unit outputs a first vibration signal, transmits the first vibration signal to the first filter for filtering undesired signal components and further transmits to the anti-shake processing unit. After detecting the vibration of the photographic device having the OIS module in the second direction due to the shake, the second vibration detection unit outputs a second vibration signal, transmits the second vibration signal to the second filter for filtering undesired signal components and further transmits to the anti-shake processing unit.

At the same time, the first position sensor outputs a first position signal according to the position of the compensation unit in the first direction, and the second position sensor outputs a second position signal according to the position of the compensation unit in the second direction. The first amplifier unit receives and amplifies the first position signal to transmit to the anti-shake processing unit, and the second amplifier unit receives and amplifies the second position signal to transmit to the anti-shake processing unit. The anti-shake processing unit processes the amplified first position signal and the amplified second position signal and the first vibration signal with the undesired signal component filtered and the second vibration signal with the undesired signal component filtered. The anti-shake processing unit uses the register unit, the PWM unit, the first driving unit and the second driving unit to respectively drive the first actuator and the second actuator, and further adjust the position of the compensation unit in the first direction and the position of the compensation unit in second direction. The first vibration detection unit may be, but not limited to, a gyro, and the second vibration detection unit may be, but not limited to, a gyro. The anti-shake processing unit can be implemented on the CPU in the form of software or a hardware unit, the CPU can be a multi-core CPU or a single-core CPU, and the compensation unit can be a lens or a photosensitive element.

According to an OIS photographic device having a peripheral driver chip disclosed in an embodiment of the present invention, the OIS photographic device having the peripheral driver chip comprises a compensation unit, an OIS mechanism unit, a peripheral driver chip, and a CPU. The OIS mechanism unit comprises a first position sensor, a second position sensor, a first actuator, and a second actuator. The peripheral driver chip comprises two servo driver circuits and a register unit. Each of the servo driver circuits comprises an amplifying circuit, a PWM unit, and a driving unit. The first position sensor outputs a first position signal according to the position of the compensation unit in the first direction, and the second position sensor outputs a second position signal according to the position of the compensation unit in the second direction. The two amplifying circuits respectively receive and amplify the first position signal and the second position signal, the CPU receives and processes the amplified first position signal and the amplified second position signal, and the CPU uses the register unit, the two PWM units and the two driving units to drive the first actuator and the second actuator and further adjust the position of the compensation unit in the first direction and the position of the compensation unit in the second direction.

According to the photographic device having the OIS module and the OIS photographic device having the peripheral driver chip disclosed in the present invention, all the circuits for image stabilization being integrated into the original CPU of the photographic device having the OIS module or all the circuits for driving the OIS mechanism unit being integrated into a driver chip can reduce the volume of the optical anti-shake module, the volume which is reduced can be used to add other elements to extend other functions, and on the other hand, the present invention can make an effective use of the CPU to reduce the cost.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
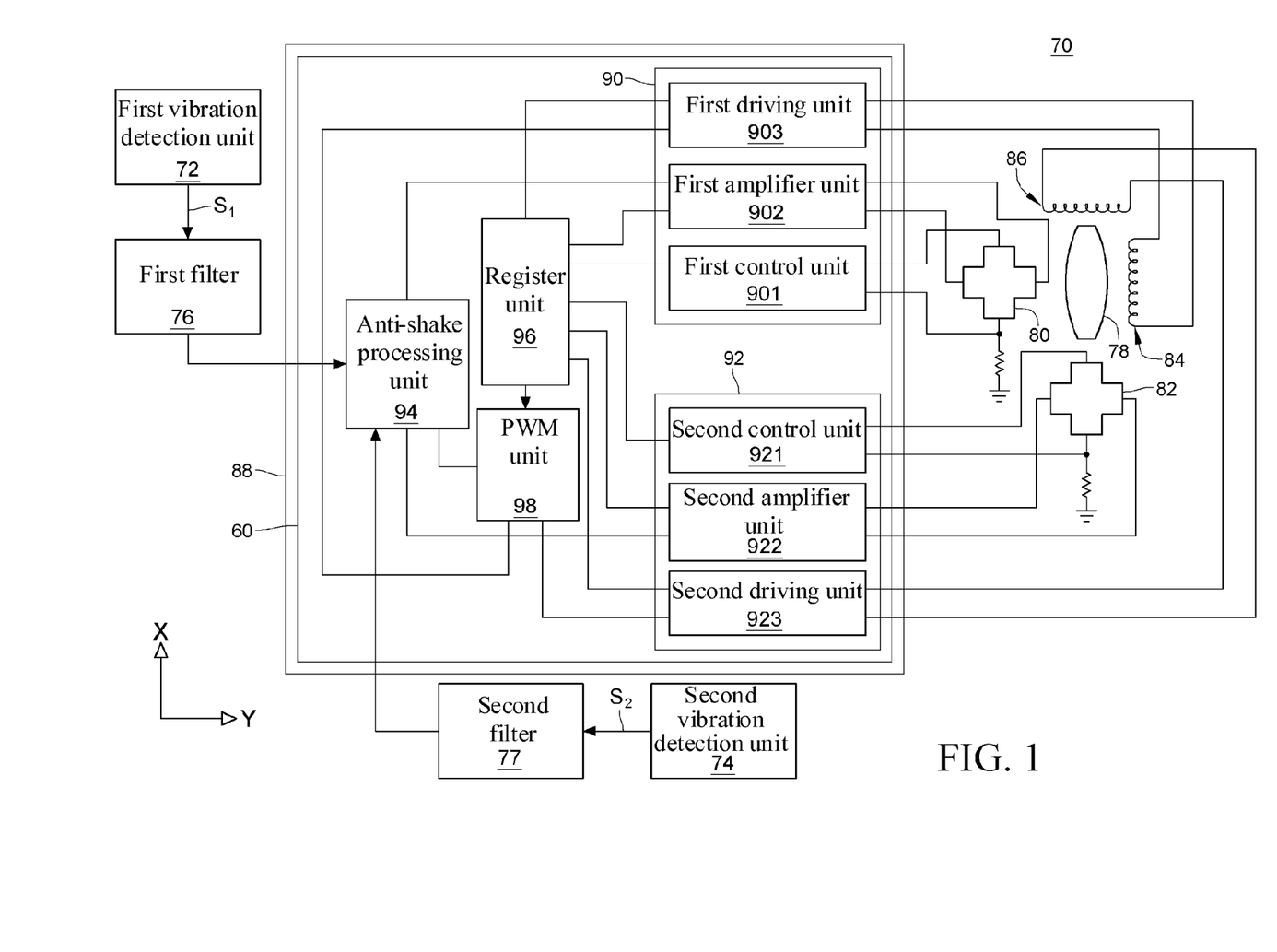
FIG. 1 is a schematic block diagram of a circuit of a photographic device having an OIS module according to an embodiment of the present invention.
Figure 2:
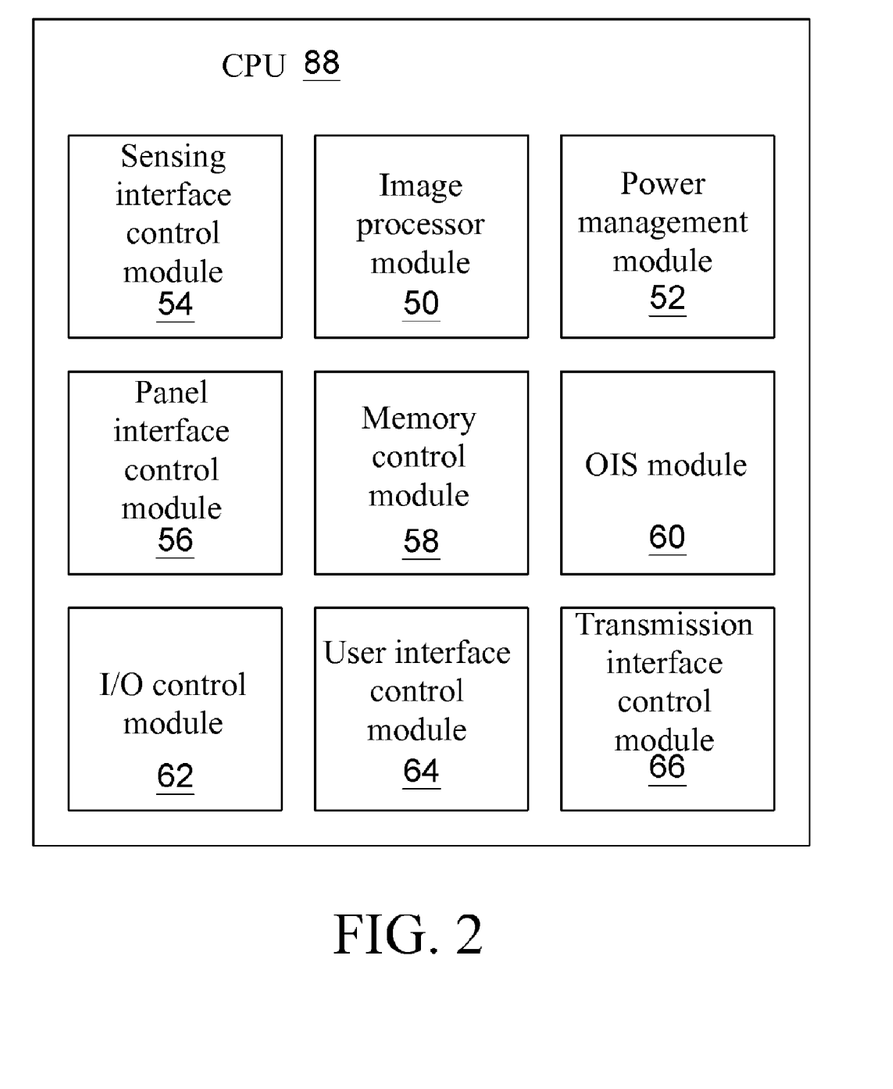
FIG. 2 is a schematic block diagram of a circuit of a CPU according to an embodiment of the present invention.

FIG. 1 and FIG. 2 are a schematic block diagram of a circuit of a photographic device having an optical image stabilization (OIS) module according to an embodiment of the present invention and a schematic block diagram of a circuit of a central processing unit (CPU) respectively. The photographic device having the OIS module 70 comprises a first vibration detection unit 72, a second vibration detection unit 74, a first filter 76, a second filter 77, a compensation unit 78, a first position sensor 80, a second position sensor 82, a first actuator 84, a second actuator 86, and a CPU 88. The first vibration detection unit 72, the first filter 76, the first actuator 84 and the first position sensor 80 are essential objects for detecting and compensating the vibration in a first direction X. The first vibration detection unit 72 is used to detect the vibration of the compensation unit 78 in the first direction X and output a first vibration signal $S_1$. The first filter 76 is used to filter an undesired signal component of the first vibration signal $S_1$. The first position sensor 80 is used to detect the position of the compensation unit 78 in the first direction X and output a first position signal. The second vibration detection unit 74, the second filter 77 and the second position sensor 82 are the essential objects for detecting and compensating the vibration in a second direction Y. The second vibration detection unit 74 is used to detect the vibration of the compensation unit 78 in the second direction Y and output a second vibration signal $S_2$. The second filter 77 is used to filter another undesired signal component of the second vibration signal $S_2$. The second position sensor 82 is used to detect the position of the compensation unit 78 in the second direction Y and output a second position signal. The first direction X and the second direction Y are perpendicular to each other.

The CPU 88 comprises an image processor module 50, power management module 52, an image sensing interface control module 54, a panel interface control module 56, a memory control module 58, an OIS module 60, an input-and-output control module 62, a user interface control module 64, and a transmission interface control module 66. In this embodiment, only the OIS module 60 is described and the details of the operations of other modules will not be illustrated herein.

The OIS module 60 comprises a first servo driver circuit 90, a second servo driver circuit 92, an anti-shake processing unit 94, a register unit 96 (or referred to as a register), and a PWM unit 98 (or referred to as the PWM). The first servo driver circuit 90 comprises a first control unit 901, a first amplifier unit 902, and a first driving unit 903. The first control unit 901 is used to control the first position sensor 80, and the first amplifier unit 902 amplifies the first position signal. The second servo driver circuit 92 comprises a second control unit 921, a second amplifier unit 922, and a second driving unit 923. The second control unit 921 is used to control the second position sensor 82, and the second amplifier unit 922 amplifies the second position signal. The anti-shake processing unit 94 receives and processes the amplified first position signal, the amplified second position signal, the first vibration signal $S_1$ passing the first filter 76, and the second vibration signal $S_2$ passing the second filter 77, and further controls the register unit 96 and the PWM unit 98 to make the first driving unit 903 drive the first actuator 84 and further adjust the position of the compensation unit 78 in the first direction X and make the second driving unit 923 drive the second actuator 86 and further adjust the position of the compensation unit 78 in the second direction Y.

Figure 3:
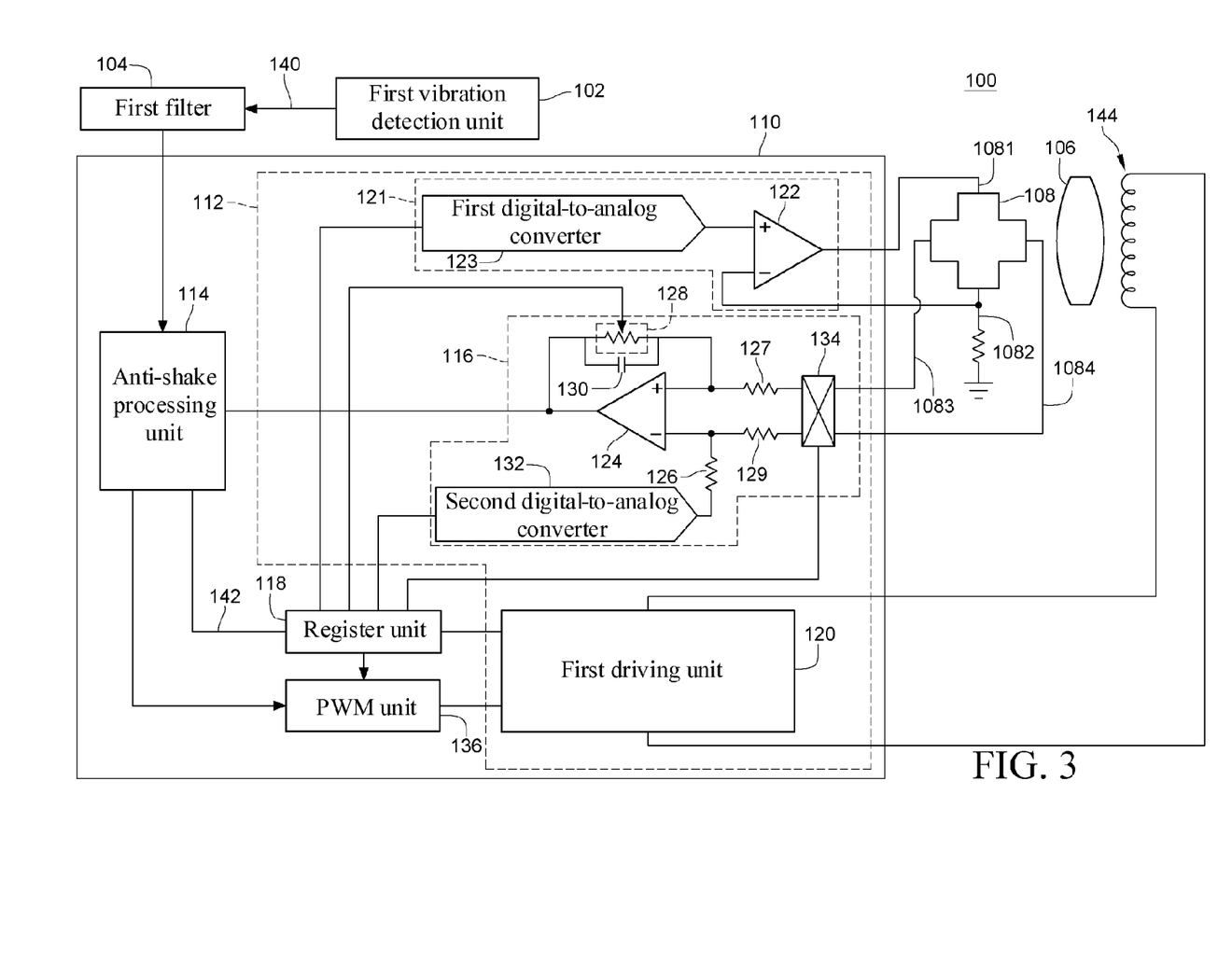
FIG. 3 is a schematic view illustrating constitution of a circuit for detecting and compensating vibration in a first direction of the photographic device having the OIS module according to an embodiment of the present invention.

Referring to FIG. 3 for details of the embodiment, FIG. 3 is a schematic view illustrating constitution of a circuit for detecting and compensating the first direction vibration of the photographic device having the OIS module according to an embodiment of the present invention. In this embodiment, the vibration compensation in the first direction (not marked) is illustrated as an example, and the vibration compensation in the second direction vibration may be deduced in the same manner.

Referring to FIG. 3, the photographic device having the OIS module 100 comprises a first vibration detection unit 102, a first filter 104, a compensation unit 106, a first position sensor 108, and a CPU 110. In this embodiment, the photographic device having the OIS module 100 may be, but not limited to, a camera, the first vibration detection unit 102 may be, but not limited to, a gyro, the compensation unit 106 may be, but not limited to, a convex lens, and the first position sensor 108 may be, but not limited to, a Hall element. For example, the photographic device having the OIS module 100 may also be a video camera and the compensation unit 106 may also be a concave lens or a photosensitive element.

The first position sensor 108 has connection ends 1081, 1082, 1083, 1084. The CPU 110 may comprise a first servo driver circuit 112, a register unit 118 (or referred to as a register), a PWM unit 136 (or referred to as a PWM), and an anti-shake processing unit 114. The first servo driver circuit 112 comprises a first amplifier unit 116, a first driving unit 120, and a first control unit 121. The first control unit 121 comprises an operational amplifier 122 and a first digital-to-analog converter 123. The first amplifier unit 116 may comprise a signal amplifier 124, a first resistor 126, a second resistor 127, a third resistor 129, a digital variable resistor 128, a capacitor 130, a second digital-to-analog converter 132, and a signal swap unit 134 (or referred to as a swap unit). The first driving unit 120 may be, but not limited to, an H-type electric bridge.

In this embodiment, a first position sensor 108 is disposed between the CPU 110 and the compensation unit 106. The connection ends 1081, 1082 are respectively coupled to the output end and a negative input end of the operational amplifier 122. The connection ends 1083, 1084 are respectively coupled to the signal swap unit 134. The signal swap unit 134 is respectively coupled to the second resistor 127 and the third resistor 129. The other end of the second resistor 127 is coupled to a positive input end of the signal amplifier 124, and the other end of the third resistor 129 is coupled to the negative input end of the signal amplifier 124. The signal swap unit 134 is controlled by the register unit 118. One end of the first digital-to-analog converter 123 is coupled to a positive input end of the operational amplifier 122 and the other end is coupled to the register unit 118. One end of the second digital-to-analog converter 132 is coupled to the first resistor 126 and the other end is coupled to the register unit 118. The other end of the first resistor 126 is coupled to the negative input end of the signal amplifier 124, and the output end of the signal amplifier 124 is coupled to the anti-shake processing unit 114. One end of the digital variable resistor 128 is coupled to the positive input end of the signal amplifier 124 and the other end is coupled to the output end of the signal amplifier 124. The resistance of the digital variable resistor 128 is controlled by the register unit 118. The capacitor 130 and the digital variable resistor 128 are connected in parallel, and the digital variable resistor 128 and the capacitor 130 form a low pass filter.

After detecting the vibration generated by the photographic device having the OIS module 100 in the first direction, the first vibration detection unit 102 outputs the first vibration signal 140 and transmits the first vibration signal 140 to the first filter 104, so as to filter the undesired signal component of the first vibration signal 140 and further transmit to the anti-shake processing unit 114.

At the same time, the first position sensor 108 detects the position of the compensation unit 106 in the first direction and generates a first position signal which is corresponding to the position of the compensation unit 106 in the first direction X (that is the voltages respectively output by the connection ends 1083, 1084) under the Hall effect. The first amplifier unit 116 receives and amplifies the first position signal. In more details, when the first position signal is transmitted to the first amplifier unit 116, the first position signal firstly passes through the signal swap unit 126. The signal swap unit 126 after actuated by the register unit 118 swaps positions of the two input ends of the signal amplifier 124 (that is, a signal which is originally transmitted to the positive input end of the signal amplifier 124 is changed to be transmitted to the negative input end the signal amplifier 124, and a signal which is originally transmitted to the negative input end of the signal amplifier 124 is changed to be transmitted to the positive input end of the signal amplifier 124) and respectively passes the second resistor 127 and the third resistor 129.

In this embodiment, the signal swap unit 126 is disposed for simplifying the wiring of the circuit design of the first amplifier unit 116. That is to say, according to the circuit design of the first amplifier unit 116, the negative input end of the signal amplifier 124 is connected to the connection end 1083 and the positive input end of the signal amplifier 124 is connected to the connection end 1084, but the above connection relation may causes the complexity of the wiring of the circuit design of the first amplifier unit 116. To simplify the wiring of the circuit design of the first amplifier unit 116, the signal swap unit 126 may be disposed in the first amplifier unit 116 to avoid the first amplifier unit 116 with the simplified circuit wiring making the negative input end of the signal amplifier 124 connected to the connection end 1084 and the positive input end of the signal amplifier 124 connected to the connection end 1083 to cause the connection errors. In other words, if the circuit design of the first amplifier unit 116 will not cause the connection errors of the positive and negative input ends of the signal amplifier 124 and the connection ends 1083, 1084, the first amplifier unit 116 does not need the signal swap unit 126.

The signal amplifier 124 receives and amplifies the first position signal, and filters the first position signal by the low pass filter formed by the digital variable resistor 128 and the capacitor 130 and then outputs the first position signal. The amplified and filtered first position signal is transmitted to the anti-shake processing unit 114.

The anti-shake processing unit 114 processes the amplified and filtered first position signal and the first vibration signal 140 with the undesired signal component filtered. The anti-shake processing unit 114 uses the register unit 118 and the first driving unit 120 drive the first actuator 126 to further adjust the position of the compensation unit 106 in the first direction. In more details, the anti-shake processing unit 114 receives and processes the first position signal passing the first amplifier unit 116 and the first vibration signal 140 passing the first filter 104 to transmit a first actuation signal 142 to the register unit 118 and drive the PWM unit 136. The register unit 118 receives and stores the first actuation signal 142, the register unit 118 and the PWM unit 136 control the first driving unit 120 to drive the first actuator 144 and further adjust the position of the compensation unit 106 in the first direction. The first actuator 144 may be, but not limited to, a voice coil motor.

In this embodiment, the anti-shake processing unit 114 may be implemented on the CPU 110 in the form of software or may be a hardware unit. The CPU 110 may process the computing of the OIS module 60 (as shown in FIG. 2) and control the operation of the first servo driver circuit 112 on one hand and process the computing and capture of the image, the power management, the memory control, the user interface control, the transmission interface control, the image sensing interface control, the panel interface control or the input/output (I/O) control on the other hand. Therefore, the CPU 110 may effectively used by the photographic device having the OIS module 100. That is to say, the CPU 110 may be a high-speed single-core CPU or a multi-core CPU.

Figure 4:
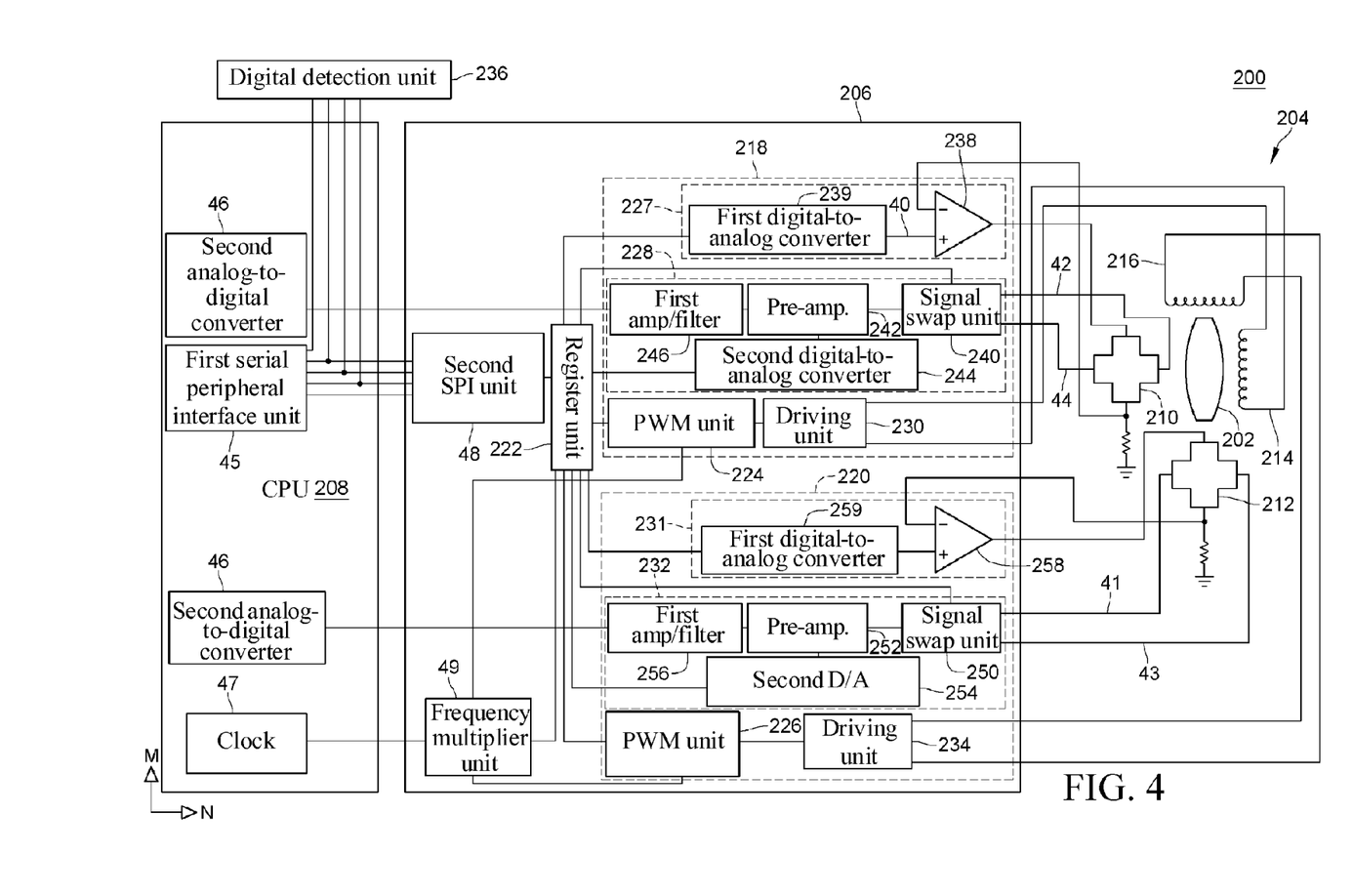
FIG. 4 is a schematic block diagram of a circuit of the OIS photographic device having the peripheral driver chip according to an embodiment of the present invention.

FIG. 4 is a schematic block diagram of a circuit of the OIS photographic device having the peripheral driver chip according to an embodiment of the present invention. The OIS photographic device having the peripheral driver chip 200 comprises a compensation unit 202, an OIS mechanism unit 204, a peripheral driver chip 206, a CPU 208, and a digital detection unit 236. The OIS mechanism unit 204 comprises a first position sensor 210, a second position sensor 212, a first actuator 214, and a second actuator 216. The peripheral driver chip 206 comprises a servo driver circuit 218, a servo driver circuit 220, and a register unit 222. In this embodiment, the OIS photographic device having the peripheral driver chip 200 may be, but not limited to, a camera, the compensation unit 202 may be, but not limited to, a convex lens, the first position sensor 210 may be, but not limited to, a Hall element, and the second position sensor 212 may be, but not limited to, a Hall element. For example, the OIS photographic device having the peripheral driver chip 200 may also be a video camera, and the compensation unit 202 may also be a concave lens or a photosensitive element.

In this embodiment, the digital detection unit 236 is used to detect the vibration of the OIS photographic device having the peripheral driver chip 200 in a first direction M and a second direction N. The first direction M and the second direction N are perpendicular to each other. The digital detection unit 236 may be, but not limited to, a digital gyro.

In this embodiment, the digital detection unit 236, the servo driver circuit 218, the first actuator 214 and the first position sensor 210 are essential objects for detecting and compensating the vibration in the first direction M. The digital detection unit 236 is used to detect the vibration of the OIS photographic device having the peripheral driver chip 200 in the first direction M and output a first vibration value (not marked). The first position sensor 210 detects the position of the compensation unit 202 in the first direction M by a Hall effect and outputs a first position signal (that is the voltages respectively output by the connection ends 42, 44).

The digital detection unit 236, the servo driver circuit 220, the second actuator 216 and the second position sensor 212 are essential objects for detecting and compensating the vibration in the second direction N. The digital detection unit 236 detects the vibration of the OIS photographic device having the peripheral driver chip 200 in the second direction N by the Hall effect and outputs a second vibration value (not marked). The second position sensor 212 is used to detect the position of the compensation unit 202 in the second direction N and outputs a second position signal (that is the voltages respectively output by the connection ends 41, 43).

The servo driver circuit 218 comprises a control unit 227, an amplifying circuit 228, a PWM unit 224, and a driving unit 230. The control unit 227 comprises an operational amplifier 238 and a first digital-to-analog converter 239, and the control unit 227 is used to control the first position sensor 210. The amplifying circuit 228 comprises a signal swap unit 240, a pre-amplifier unit 242 (or referred to as a pre-amp. as shown in FIG. 4), a first amplifier and filter unit 246 (or referred to as a first amp/filter as shown in FIG. 4), and a second digital-to-analog converter 244. The amplifying circuit 228 is used to receive and amplify the first position signal (that is the voltages respectively output by the connection ends 42, 44). The servo driver circuit 220 comprises a control unit 231, an amplifying circuit 232, a PWM unit 226, and a driving unit 234. The control unit 231 comprises an operational amplifier 258 and a first digital-to-analog converter 259, and the control unit 231 is used to control the second position sensor 212. The amplifying circuit 232 comprises a signal swap unit 250, a pre-amplifier unit 252 (or referred to as a pre-amp. as shown in FIG. 4), a first amplifier and filter unit 256 (or referred to as a first amp/filter as shown in FIG. 4), and a second digital-to-analog converter 254 (or referred to as a second D/A as shown in FIG. 4). The amplifying circuit 232 is used to receive and amplify the second position signal (that is the voltages respectively output by the connection ends 41, 43). The driving unit 230 may be, but not limited to, the H-type electric bridge, and the driving unit 234 may be, but not limited to, the H-type electric bridge.

The CPU 208 is used to receive and process the amplified first position signal (that is the voltages respectively output by the connection ends 42, 44) and the amplified second position signal (that is the voltages respectively output by the connection ends 41, 43). The register unit 222, the PWM unit 224, the PWM unit 226, the driving unit 230 and the driving unit 234 of the peripheral driver chip 206 drives first actuator 214 and the second actuator 216, and further adjust the position of the compensation unit 202 in the first direction M and the position of the compensation unit 202 in the second direction N.

Hereinafter, only the compensation of the vibration in the first direction M is described in the above embodiments and the compensation of the vibration in the second direction N can be deduced in the same way.

In this embodiment, two connection ends 42, 44 of the first position sensor 204 are respectively coupled to the signal swap unit 240. The signal swap unit 240 is controlled by the register unit 222. One end of the second digital-to-analog converter 244 is coupled to the pre-amplifier unit 242 and the other end is coupled to the register unit 222. One end of the first amplifier and filter unit 246 is coupled to the pre-amplifier unit 242 and the other end is coupled to the CPU 208. One end of the first analog-to-digital converter 239 in the control unit 227 is connected to the register unit 222 and the other end is connected to a positive input end 40 of the operational amplifier 238. The pre-amplifier unit 242 is used to receive and amplify the first position signal (that is the voltages respectively output by the connection ends 42, 44), and the first amplifier and filter unit 246 is used to amplify the amplified first position signal again and filter the undesired signal component (that is, the first amplifier and filter unit 246 can remove the noises). The second digital-to-analog converter 244 is used to control the pre-amplifier unit 242, and the signal swap unit 240 is used to simplify the wiring of the circuit design of the first amplifying circuit 228.

The CPU 208 may further comprise a first serial peripheral interface unit 45, a second analog-to-digital converter 46, and a clock 47. The peripheral driver chip 206 may further comprise a second serial peripheral interface unit 48 (or referred to as a second SPI unit as shown in FIG. 4) and a frequency multiplier unit 49. The first serial peripheral interface unit 45 is coupled to the second serial peripheral interface unit 48, the clock 47 is coupled to the frequency multiplier unit 49, and the second analog-to-digital converter 46 is coupled to the first amplifier and filter unit 246.

After detecting the vibration generated by the photographic device 200 having the OIS circuit in the first direction M, the digital detection unit 236 outputs the first vibration value (not marked) to the CPU 208. The first position sensor 210 detects the position of the compensation unit 202 in the first direction M and transmits the first position signal (that is, the voltages respectively output by the connection ends 42, 44), and the amplifying circuit 228 receives and amplifies the first position signal.

In more details, when the first position signal is transmitted to the amplifying circuit 228, the first position signal firstly passes through the signal swap unit 240. After actuated by the register unit 222, the signal swap unit 240 swaps positions of two input ends of the pre-amplifier unit 242. The pre-amplifier unit 242 receives and amplifies the first position signal. The first amplifier and filter unit 246 amplifies the amplified first position signal again and filters the undesired signal component (that is, the first amplifier and filter unit 246 can remove the noises) and transmits to the second analog-to-digital converter 46 of the CPU 208.

The CPU 208 processes the amplified and filtered first position signal and first vibration value, and the register unit 222, the PWM unit 224 and the driving unit 230 drive the first actuator 214 and adjust the position of the compensation unit 202 in the first direction M. In more details, the CPU 208 receives and processes the first vibration value and the first position signal passing the amplifying circuit 228, and the first serial peripheral interface unit 45 and the second serial peripheral interface unit 48 transmit a first moving signal (not marked) to the register unit 222. The OIS photographic device having the peripheral driver chip 200 outputs a first fundamental frequency signal (not marked) to the register unit 222 and the PWM unit 224 through the clock 47 and the frequency multiplier unit 49. The register unit 222 controls the PWM unit 224 by the use of the first moving signal and the first fundamental frequency signal, so that the PWM unit 224 may output a first duty cycle signal (not marked) to the driving unit 230, and then the first actuator 214 adjusts the position of the compensation unit 202 in the first direction M. The first actuator 214 may be, but not limited to, a voice coil motor.

In this embodiment, the CPU 208 processes the computing of the OIS and controls the operations of the peripheral driver chip 206 on one hand and processes the computing and capture of the image, the power management, the memory control, the user interface control, the transmission interface control, the image sensing interface control, the panel interface control or the I/O control on the other hand. Therefore, the CPU 208 may be effectively used by the OIS photographic device having the peripheral driver chip 200.

Figure 5:
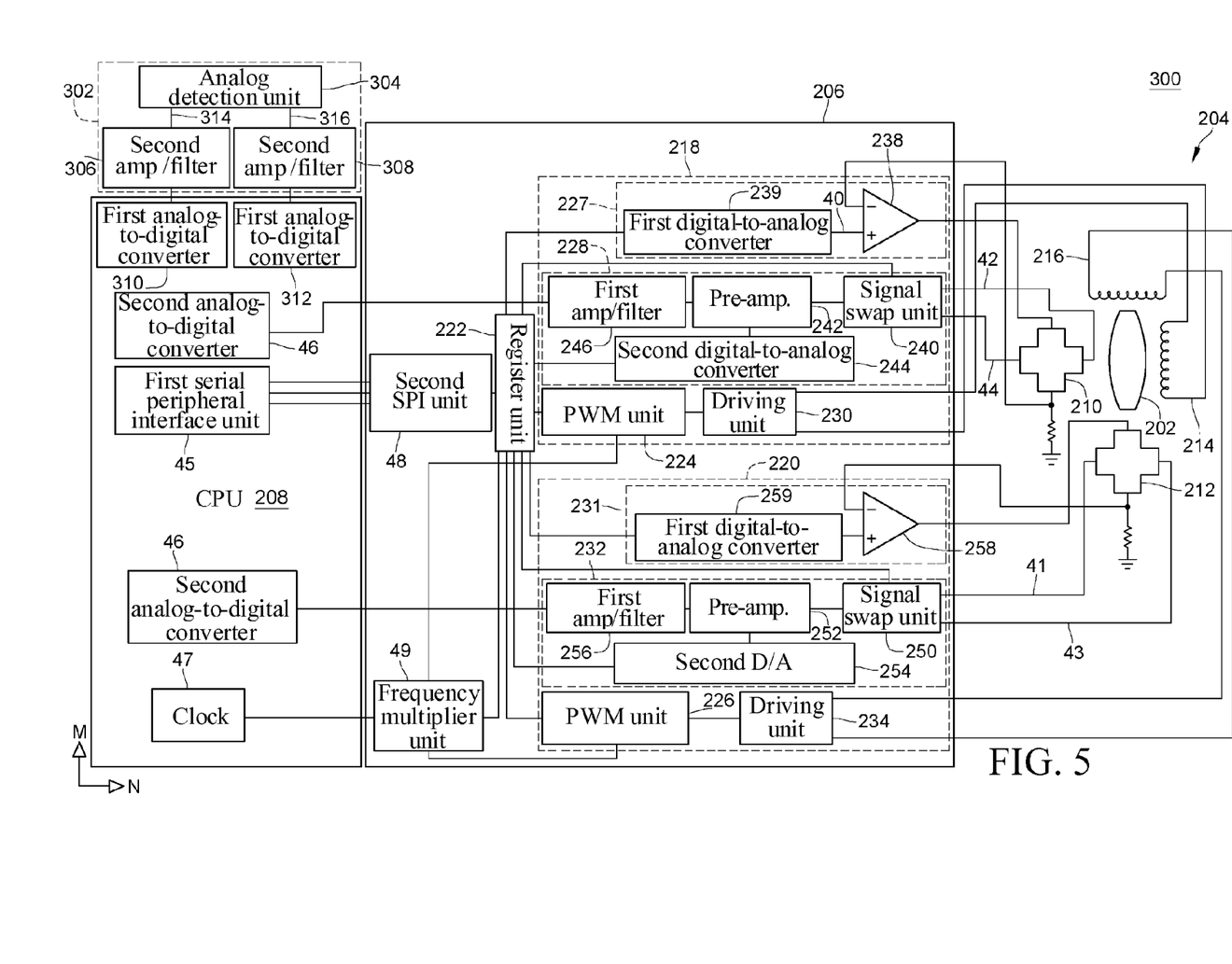
FIG. 5 is a schematic block diagram of a circuit of the OIS photographic device having the peripheral driver chip according to another embodiment of the present invention.

In the above embodiment of FIG. 4, the digital detection unit 236 is used to detect the vibration in the first direction M and the second direction N, but this embodiment is not intended to limit the scope of the present invention. That is to say, the device for detecting the vibration in the first direction M and the vibration in the second direction N may also be an analog detection module. FIG. 5 is a schematic block diagram of a circuit of the OIS photographic device having the peripheral driver chip according to another embodiment of the present invention. In this embodiment, the OIS photographic device having the peripheral driver chip 300 detects the vibration in the first direction M and the vibration in the second direction N by an analog detection module 302. The analog detection module 302 comprises an analog detection unit 304, a second amplifier and filter unit 306 (or referred to as a second amp/filter as shown in FIG. 5), and a second amplifier and filter unit 308 (or referred to as a second amp/filter as shown in FIG. 5), and the CPU 208 further comprises a first analog-to-digital converter 310 and a first analog-to-digital converter 312.

The analog detection unit 302 detects the vibration of the OIS photographic device having the peripheral driver chip 300 in the first direction M and outputs a first vibration signal 314 to the second amplifier and filter unit 306. The second amplifier and filter unit 306 amplifies the first vibration signal 314 and filters the noises of the amplified first vibration signal 314. The first analog-to-digital converter 310 of the CPU 208 converts the amplified first vibration signal 314 with the noises filtered into a first vibration value (not marked), the CPU 208 receives and processes the first vibration value and the amplified first position signal, and the CPU 208 uses the peripheral driver chip 206 and the first actuator 214 to adjust the position of the compensation unit 202 in the first direction M.

The analog detection unit 302 detects the vibration of the OIS photographic device having the peripheral driver chip 300 in the second direction N and outputs a second vibration signal 316 to the second amplifier and filter unit 308. The second amplifier and filter unit 308 amplifies the second vibration signal 316 and filters the noises of the amplified second vibration signal 316. The first analog-to-digital converter 312 of the CPU 208 converts the amplified second vibration signal 316 with the noises filtered into a second vibration value (not marked), the CPU 208 receives and processes the second vibration value and the amplified second position signal, and the CPU 208 uses the peripheral driver chip 206 and the second actuator 216 to adjust the position of the compensation unit 202 in the second direction N.

Figure 6:
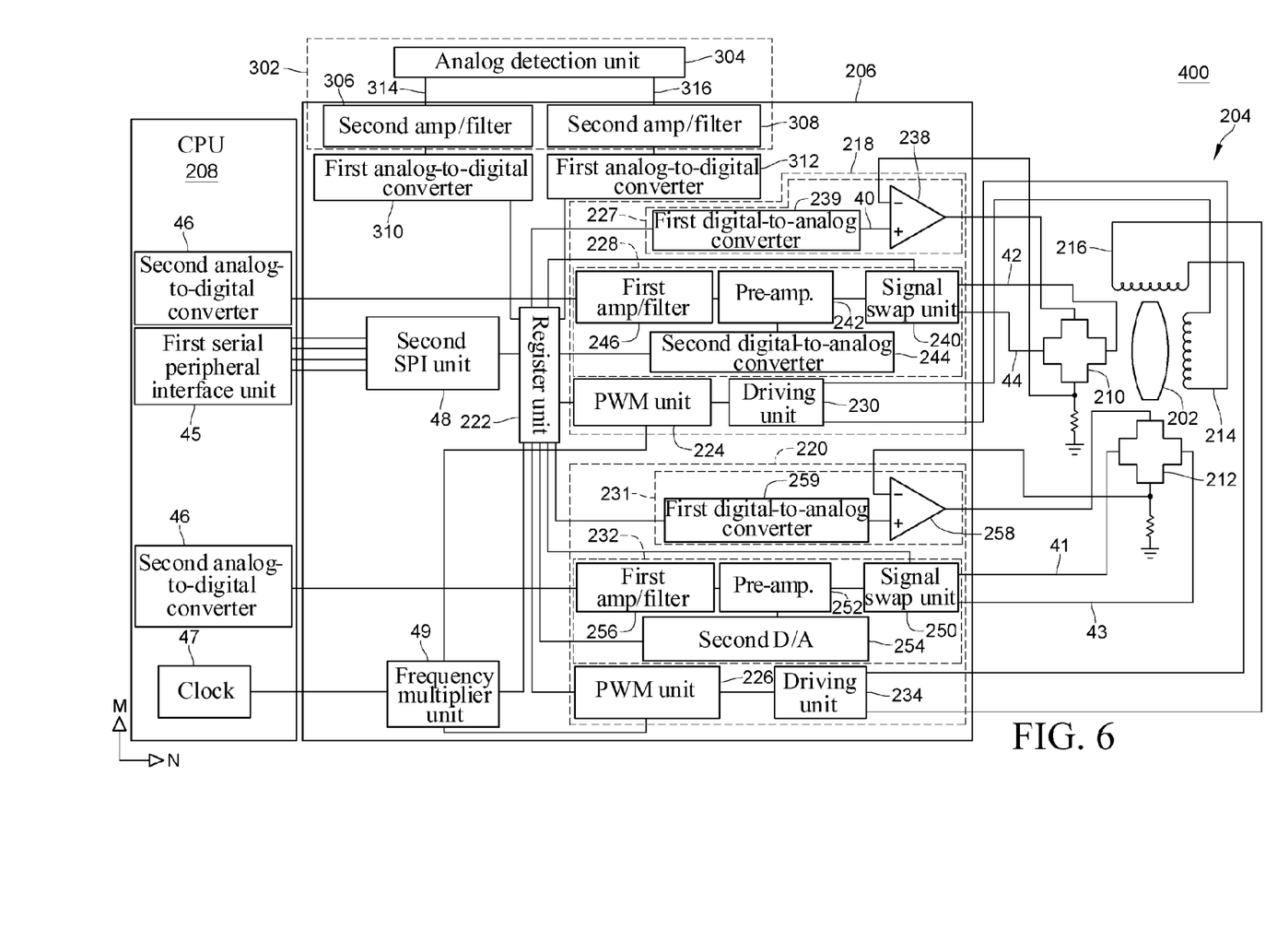
FIG. 6 is a schematic block diagram of a circuit of the OIS photographic device having the peripheral driver chip according to still another embodiment of the present invention.

In the above embodiment, the analog detection module 302 is coupled to the first analog-to-digital converters 310, 312 of the CPU 208, but this embodiment is not intended to limit the scope of the present invention. That is to say, the second amplifier and filter units 306, 308 and the first analog-to-digital converters 310, 312 of the analog detection module 302 may be integrated in the peripheral driver chip 206. FIG. 6 is a schematic block diagram of a circuit of the OIS photographic device having the peripheral driver chip according to still another embodiment of the present invention. In this embodiment, the second amplifier and filter units 306, 308 and the first analog-to-digital converters 310, 312 in the analog detection module 302 of the OIS photographic device having the peripheral driver chip 400 are integrated in the peripheral driver chip 206 and the operation manner thereof is the same as the above embodiment.

According to the photographic device having the OIS module and the OIS photographic device having the peripheral driver chip of the present invention, the circuit required by the OIS and the CPU originally existing in the photographic device may be integrated or the circuit for driving the OIS mechanism unit may be integrated into the peripheral driver chip, thereby reducing the volume of the optical anti-shake module to meet the market demands and the other elements may be added in the reduced volume to extend other functions. On the other hand, the present invention solves the problem of increased cost existing in the prior art caused by the fact that the OIS circuit and CPU needs a further processing step to communicate with each other due to the cross-platform operation and also makes an effective use of the CPU, thus reducing the cost.

What is claimed is:

1. A photographic device having an optical image stabilization (OIS) module, comprising:
a compensation unit;
a first position sensor, used to output a first position signal according to a position of the compensation unit in a first direction;
a second position sensor, used to output a second position signal according to a position of the compensation unit in a second direction; and
a central processing unit (CPU), comprising:
a first servo driver circuit, comprising:
a first amplifier unit, connected to the first position sensor, configured to receive and amplify the first position signal; and
a first driving unit;
a second servo driver circuit, comprising:
a second amplifier unit, connected to the second position sensor, configured to receive and amplify the second position signal; and
a second driving unit;
a register, connected to the first driving unit, the first amplifier, the second amplifier and the second driving unit;
a pulse width modulator (PWM) unit, connected to the register, the first driving unit and the second driving unit; and
an anti-shake processing unit, connected to the PWM unit, the first amplifier unit and the second amplifier unit, the anti-shake processing unit configured to receive and process the amplified first position signal and the amplified second position signal, and use the register, the PWM unit, the first driving unit and the second driving unit to drive a first actuator and a second actuator and further adjust the compensation unit in the first direction and in the second direction.

2. The photographic device having the OIS module according to claim 1, wherein the first amplifier unit comprises a signal amplifier and a swap unit, the signal amplifier amplifies the first position signal to transmit the amplified signal to the anti-shake processing unit, the swap unit is connected to two input ends of the signal amplifier, and when the swap unit is actuated, the swap unit exchanges the two input ends of the signal amplifier.

3. The photographic device having the OIS module according to claim 2, wherein the first amplifier unit further comprises a digital variable resistor, the input ends are respectively a positive input end and a negative input end, and two ends of the digital variable resistor are respectively connected to an output end and the positive input end of the signal amplifier.

4. The photographic device having the OIS module according to claim 3, wherein the first amplifier unit further comprises a capacitor, and the capacitor and the digital variable resistor are connected in parallel.

5. The photographic device having the OIS module according to claim 1, wherein the CPU is a multi-core CPU.

6. The photographic device having the OIS module according to claim 1, wherein the CPU is a single-core CPU.

7. The photographic device having the OIS module according to claim 1, wherein the compensation element is a lens.

8. The photographic device having the OIS module according to claim 1, wherein the compensation element is a photosensitive element.

9. An optical image stabilization (OIS) photographic device having a peripheral driver integrated chip, comprising:
a compensation unit;
an OIS mechanism unit, comprising:
a first position sensor, used to output a first position signal according to a position of the compensation unit in a first direction;
a second position sensor, used to output a second position signal according to a position of the compensation unit in a second direction;
a first actuator, used to adjust the position of the compensation unit in the first direction; and
a second actuator, used to adjust the position of the compensation unit in the second direction;
a peripheral driver chip, comprising:
two servo driver circuits, wherein each of the servo driver circuits comprises:
an amplifying circuit, configured to receive and amplify the first position signal and the second position signal;
a pulse width modulation (PWM) unit; and
a driving unit, connected to the PWM unit; and
a register unit, connected to the PWM units and the amplifying circuits of the servo driver circuits; and
a central processing unit (CPU), connected to the amplifying circuits of the servo driver circuits, electronically connected to the register unit, and used to receive and process the amplified first position signal and the amplified second position signal, wherein the register unit, the PWM units and the driving units drive the first actuator and the second actuator and further adjust the positions of the compensation unit in the first direction and in the second direction.

10. The OIS photographic device having the peripheral driver chip according to claim 9, wherein each of the amplifying circuits comprises a pre-amplifier unit, a first amplifier and filter unit, and a signal swap unit, the pre-amplifier units respectively amplify the first position signal and the second position signal to respectively transmit the amplified signals to the first amplifier and filter units, the first amplifier and filter units respectively amplify the amplified first position signal and the amplified second position signal again, filter noises and then transmit to the CPU, the signal swap units are respectively connected to two input ends of the pre-amplifier unit, and when each of the signal swap units is actuated, each of the signal swap units respectively exchanges the two input ends of the pre-amplifier unit.

11. The OIS photographic device having the peripheral driver chip according to claim 9, wherein the compensation element is a lens.

12. The OIS photographic device having the peripheral driver chip according to claim 9, wherein the compensation element is a photosensitive element.

13. The OIS photographic device having the peripheral driver chip according to claim 9, further comprising an analog detection unit, wherein the peripheral driver chip further comprises two second amplifier and filter units and two first analog-to-digital converters, the second amplifier and filter units are respectively coupled to the analog detection unit, the analog detection unit detects the vibration of the OIS photographic device having the peripheral driver chip in the first direction and in the second direction and outputs a first vibration signal and a second vibration signal respectively to the second amplifier and filter units, the second amplifier and filter units respectively amplify the first vibration signal and the second vibration signal and filter noises of the amplified first vibration signal and the amplified second vibration signal, the first analog-to-digital converters respectively convert the amplified first vibration signal and the amplified second vibration signal with the noises filtered into a first vibration value and a second vibration value and transmit the first vibration value and the second vibration value to the CPU, the CPU receives and processes the amplified first position signal, the amplified second position signal, the first vibration value and the second vibration value, and the CPU uses the peripheral driver chip, the first actuator and the second actuator to adjust the positions of the compensation unit in the first direction and in the second direction.

14. The OIS photographic device having the peripheral driver chip according to claim 9, further comprising an analog detection module, wherein the CPU comprises two first analog-to-digital converters, the analog detection module comprises an analog detection unit and two second amplifier and filter units, the analog detection unit detects vibration of the OIS photographic device having the peripheral driver chip in the first direction and in the second direction and outputs a first vibration signal and a second vibration signal respectively to the second amplifier and filter units, the second amplifier and filter units respectively amplify the first vibration signal and the second vibration signal and filter noises of the amplified first vibration signal and the amplified second vibration signal, the first analog-to-digital converters respectively convert the amplified first vibration signal and the amplified second vibration signal with the noises filtered into a first vibration value and a second vibration value and output the first vibration value and the second vibration value, the CPU receives and processes the amplified first position signal, the amplified second position signal, the first vibration value and the second vibration value, and the CPU uses the peripheral driver chip, the first actuator and the second actuator to adjust the positions of the compensation unit in the first direction and the second direction.

15. The OIS photographic device having the peripheral driver chip according to claim 9, further comprising a digital detection unit, wherein the digital detection unit detects vibration of the OIS photographic device having the peripheral driver chip in the first direction and in the second direction and generates a first vibration value and a second vibration value, the CPU receives and processes the amplified first position signal, the amplified second position signal, the first vibration value and the second vibration value, and the CPU uses the peripheral driver chip, the first actuator and the second actuator to adjust the positions of the compensation unit in the first direction and in the second direction.

* * * * *